United States Patent [19]

Segawa et al.

[11] 4,068,034

[45] Jan. 10, 1978

[54] HEAT-INSULATION LAMINATE OF POLYVINYLIDENE FLUORIDE, METAL AND PLASTIC

[75] Inventors: Masahiro Segawa; Mitsuru Ota; Yoshiyuki Hada, all of Iwaki, Japan

[73] Assignee: Kureha Kagaku Kogyo Kabushiki Kaisha, Tokyo, Japan

[21] Appl. No.: 549,818

[22] Filed: Feb. 13, 1975

[30] Foreign Application Priority Data

Feb. 20, 1974 Japan .................................. 49-16361

[51] Int. Cl.$^2$ .................................................. B32B 7/00

[52] U.S. Cl. .................................... 428/263; 428/310; 428/316; 428/421; 428/457; 428/461; 428/460; 428/464; 428/465; 252/62

[58] Field of Search ............... 428/263, 421, 457, 461, 428/460, 464, 465, 310, 316; 252/62; 260/92.1 R; 526/255

[56] References Cited

U.S. PATENT DOCUMENTS

| | | | |
|---|---|---|---|
| 3,152,950 | 10/1964 | Palmquist et al. | 428/460 X |
| 3,170,811 | 2/1965 | Sands | 428/421 |
| 3,449,305 | 6/1969 | Stilmar | 428/421 X |
| 3,510,429 | 5/1970 | Iserson et al. | 252/62 |
| 3,655,426 | 4/1972 | Fuchs | 428/421 |
| 3,708,463 | 1/1973 | Stallings | 526/255 X |
| 3,783,057 | 1/1974 | McNerney | 428/421 |
| 3,799,832 | 3/1974 | Reick | 428/421 X |
| 3,850,674 | 11/1974 | Clarke, Jr. | 428/421 |
| 3,940,527 | 2/1976 | Brandon | 428/421 X |

*Primary Examiner*—P. C. Ives

*Attorney, Agent, or Firm*—Lane, Aitken, Dunner & Ziems

[57] ABSTRACT

Metallized plastic composite films including a metallic layer, a layer of a polyvinylidene fluoride homopolymer or copolymer and, optionally, a layer of reinforcing or other insulating material are disclosed.

7 Claims, 3 Drawing Figures

4

3

5

6

C
B
A
C'
B'
A'
°C
MIN
0
10
20
30
40
50

1
2

3
4
5
6

HEAT-INSULATION LAMINATE OF POLYVINYLIDENE FLUORIDE, METAL AND PLASTIC

FIELD OF THE INVENTION

This invention relates to a heat-insulation material, more particularly to a heat-insulation material of the type used for covering surfaces such as of building roofs, exterior walls, outdoor oil tanks, refrigerators, vehicles, other structues and machinery for the purpose of insulating the surfaces against radiant heat.

BACKGROUND OF THE INVENTION

Sheets of aluminum, silver and other metals have long been utilized for insulating articles to intercept radiant heat. Metals are generally susceptible to oxidation and other similar chemical changes due to exposure to the air and therefore, are gradually deprived of surface gloss with lapse of time. Aluminum, for example, undergoes gradual oxidation in the air causing aluminum oxide to form on the surface thereof, with the result that the surface is gradually deprived of gloss over a period of time. When a sheet of a metal is used for insulating an article against heat, the insulating value thereof decreases proportionately as the surface gloss of the metal gradually decreases with passage of time.

In recent years, the so-called metallized plastic films which are obtained by causing a layer of metal such as aluminum, zinc and silver to adhere, by the technique of vacuum deposition or plating, to one surface of a transparent plastic film, such as transparent polyvinyl chloride or transparent polyethylene terephthalate have been used as heat-insulation materials. The composite films which are obtained by adhering a heat-insulation material or reinforcing material such as foam plastic, felt, fabric or metal to the metal surface of metallized plastic films are also used as heat-insulation materials. The metallized plastic films or the composite films are used with their plastic film surfaces facing in the direction of the radiant heat source so as to preclude the previously mentioned problem associated with the use of metal sheets as heat-insulation materials. Since these exterior surfaces are formed of plastic materials such as polyvinyl chloride or polyethylene terephthalate which do not have a satisfactory insulating effect, they tend to become contaminated and and to deteriorate with prolonged use. Therefore, they have the disadvantage that they have a short life especially when used in outdoor services.

SUMMARY OF THE INVENTION

It is, therefore, an object of this invention to provide a heat-insulation material having outstanding insulating characteristics.

Another object of this invention is to provide a heat-insulation material which can endure prolonged use without degradation of its insulating value.

These and other objects of the present invention will become apparent from the following description of the invention.

It has now been discovered that a heat-insulation material which satisfies the above criteria can be obtained by adhering a metal layer to one surface of a transparent film of polyvinylidene fluoride and, optionally, adhering a priming material to the other surface of the metal layer.

Accordingly, the present invention provides a heat-insulation composite material or laminate which is characterized by a layer of a transparent film of polyvinylidene fluoride, a layer of a metal adhered to one surface of the film and, optionally, a layer of a priming material adhered to the other surface of the metal.

BRIEF EXPLANATION OF THE DRAWINGS

In the accompanying drawings.

DETAILED DESCRIPTION OF THE INVENTION:

The polyvinylidene fluoride layer of the material of the present invention, may be the homopolymer of vinylidene fluoride or a copolymer formed of vinylidene fluoride and another monomer and posessing properties substantially equal to those of the homopolymer. One or more monomers selected from the group consisting of tetrafluoroethylene, hexafluoropropylene, monochlorotrifluoroethylene, vinyl fluoride, perfluorovinylalkyl ethers, vinyl acetate and ethylene can be used for copolymerization with the polyvinylidene fluoride. The film of polyvinylidene fluoride is transparent and is either an unoriented film produced by the technique of extrusion of casting or an oriented film obtained by stretching the unoriented film. The film has a thickness of 2 to 200 microns.

Examples of the metal suitable for incorporation into the composites of present invention include copper, silver, gold, magnesium, zinc, cadmium, antimony, aluminum, tin, chromium, nickel, palladium and platinum which find utility in the technical fields of vacuum deposition and plating. From the standpoint of durability, reflectivity and cost, however, use of silver, zinc, aluminum, antimony or chormiun is advantageous.

The heat-insulation material of the present invention is a product obtained by adhering a layer of one of the metals mentioned above to one surface of the aforementioned polyvinylidene fluoride film and adhering a priming material to the opposite surface of the metal layer. The adhesion of the metal layer to one surface of the polyvinylidene film can be accomplished by ordinary means such as vacuum deposition or plating. The metal layer ordinarily has a thickness roughly in the range of from 0.01 to 0.5 microns.

The heat-insulation material of the present invention may be in the form of a laminate which has a priming material additionally adhered to the exposed metal surface of the product obtained, as already described, by adhering a metal layer to one surface of a polyvinylidene fluoride film. The term "priming material" as used herein means a heat-insulation material or reinforcing material such as paper, fabric, glass cloth, wood sheet, plastic, foam plastic, or metal. It is especially preferred to use plastic as the priming material. The plastic is advantageously used in a soft or foamed form, for example, polyvinylchloride, polyethylene, polypropylene, ABS resin, polystyrene, natural rubber, synthetic rubber, polycarbonate, polymethylmethacrylate, polyurethane, and the like. Adhesion of the priming material to the metal surface of the heat-insulating material can be accomplished by use of an adhesive or binding agent, for example.

Figure 1:
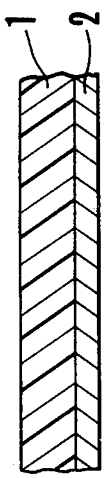
FIG. 1 represents a cross section of a heat-insulation material of the present invention.
Figure 2:
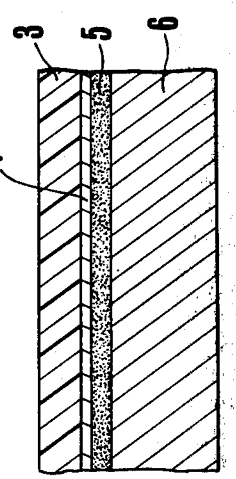
FIG. 2 illustrates a cross section of another heat-insulation material of the invention.

The structure of the heat-insulation material of the present invention will be described more specifically by reference to the accompanying drawings. In FIG. 1, 1 denotes a transparent layer of polyvinylidene fluoride film and 2 a layer of metal. The heat-insulation material of this invention is obtained by adhering a priming material to the surface of the layer of metal 2 as shown in FIG. 2. In FIG. 2, 3 denotes a transparent layer of polyvinylidene fluoride film, 4 a layer of metal, 5 a layer of adhesive or biding agent and 6 a layer of priming material, respectively. Thus, the heat-insulation material of this invention is a multi-layer structure as shown in FIG. 2.

Effective use of the heat-insulation material of the present invention is achieved simply by covering surfaces such as building roofs, exterior walls, outdoor oil tanks, refrigerators, vehicles, other structures and machinery which are exposed to radiant heat, with the polyvinylidene fluoride film surface thereof (the upper surface of the layer 3 in FIG. 2) facing the direction of the source of radiant heat. Specifically, this is effected simply by applying an adhesive or binding agent directly to the exposed surfaces of the articles and then bringing the rear surface (priming layer surface) of the heat-insulation material into contact with the applied layer of adhesive or binding agent or by first coating the exposed surfaces with, for example, an additional insulation material and subsequently adhering the heat-insulation material fast to the thus coated surface by use of an adhesive or binding agent. Where the heat-insulation material has a structure including the priming material adhered as illustrated in FIG. 2 the required secure adhesion of the heat-insulation material to the surface to be protected can be accomplished by use of nails or bolts, for example, instead of using an adhesive or binding agent. The heat-insulation material can also be fastened or nailed to the surfaces to be protected by means of a frame or beam. Any other adequate means may be freely adopted for the purpose of this adhesion. If the priming material and the surface of an object being insulated happen to be made of one and the same substance such as polyvinyl chloride, for example, then the required fast adhesion can be accomplished by high-frequency welding.

It is generally held that the insulating property of the so-called metallized plastic film depends on the magnitude of the metallic luster which is manifest through the plastic film. When the heat-insulation material of the present invention which is formed with aluminum vacuum deposited on one surface of a transparent film of polyvinylidene fluoride is compared, in terms of the magnitude of metallic luster, with a metallized polyvinyl chloride film and a metallized polyethylene terephthalate film both of the prior art, it is found that the metallized polyethylene terephthalate film excels over the other two films and that the heat-insulation material of the present invention is about equal to the metallized polyvinyl chloride film and, is inferior to the metallized polyethylene terephthalate film. When the three films are compared under identical conditions for insulating value, however, it is quite unexpectedly found that, as will become clear from the preferred embodiments described below, the heat-insulation material of the present invention exhibits the best insulating ability among the three films tested. This effect would not be expected from the conventional widely accepted theory that the insulating property of a metallized plastic film depends on the magnitude of metallic luster.

As is universally known, polyvinylidene fluoride by far excels all the other plastic substances in terms of weatherability and offers resistance to pollution and wear. Because of the use of polyvinylidene fluoride as a component element, the heat-insulation material of the present invention endures over prolonged use. Thus, it enjoys a distinct advantage that, particularly in outdoor services, it provides an extremely long life as compared with that of any metallized plastic film known to the prior art.

This invention will be described more specifically herein below with reference to preferred embodiments. It should be noted, however, that the present invention is not limited in any way to these examples.

EXAMPLE 1

Aluminum was vacuum deposited on one surface of a transparent biaxially oriented film (12 microns in thickness) of polyvinylidene fluoride (hompolymer) to produce a heat-insulation material. The resultant metallized film was adhered, with the aluminum surface thereof as the contact face, to a flexible sheet of polyvinyl chloride as the substrate by the medium of a commercially available chloroprene-based adhesive agent (CS-4640H made by Cemedyne Company). This was used as test specimen (A).

Measurement of the insulating effect was made as follows. On the open end of a lidless gypsum-board box (measuring 20 cm × 20 cm × 20 cm in outside dimensions and 1 cm in board thickness), the test specimen was placed so that the polyvinylidene fluoride layer faced outwardly and the substrate faced the interior of the box, with the edges fastened with adhesive tape to the sides of the box to seal the interior of the box. At a distance of 4 cm from the surface of the test specimen, an infrared-ray lamp (100 V, 500 WR) made by Toshiba was placed in such a position that light from the lamp impinged on the surface at an angle of 60° at the center of the test specimen.

Then, two thermocouples were placed to serve as temperature-detecting terminals, one at the center of the test specimen and the other at a point 8 mm from the surface of the substrate in the interior of the box in a vertical line passing through the center of the test specimen. The lamp was turned on and the temperatures at the points of measurement registered on respective self-recording devices.

For purpose of comparison, test specimen (B) and test specimen (C) were produced by faithfully repeating the procedure followed in the preparation of test specimen (A), except a biaxially oriented polyvinyl chloride film (12 microns in thickness) and a biaxially oriented polyethylene terephthalate film (12 microns in thickness) were used in place of the polyvinylidene fluoride. These test specimens were tested for their insulating property using the same test apparatus.

Figure 3:
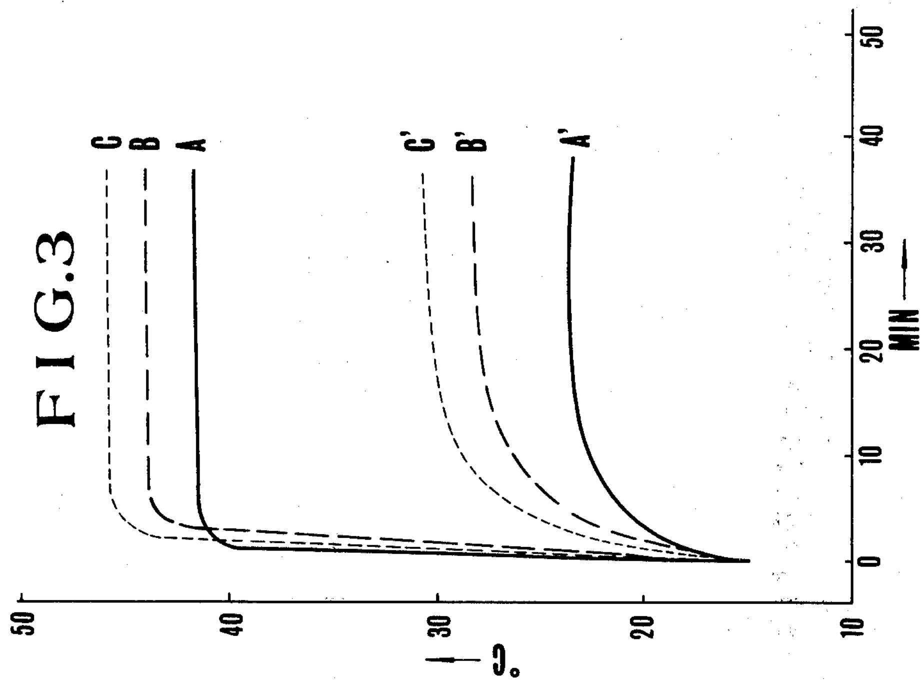
FIG. 3 is a graph showing the insulating effect of the heat-insulation material of the present invention in comparison with that of the heat-insulation material of the prior art.

The results of the test are collectively given in FIG. 3. In the graph, A and A' are the curves showing changes of the temperature on the surface and the temperature inside the box respectively for test specimen (A). The same applies to the curves of test specimens (B) and (C).

In FIG. 3, the time of infrared ray radiation (minutes) is graduated on the horizontal axis and the temperature (°C) on the vertical axis, respectively.

It is seen from FIG. 3 that in the case of test specimen (A), the temperature increased on the surface and inside the box are decidedly small as compared with those of the other test specimens, suggesting that the heat-insulation material of the present invention provides superior insulation efficiency. This means that the heat-insulation material of the present invention, if used in the roofing material for an air-conditioned vehicle, will prevent the temperature of the vehicle's interior from being elevated by the heat from the sun and consequently, will lower the expense of air-conditioning.

EXAMPLE 2

The procedure of Example 1 was repeated, except a stainless steel sheet 0.4 mm in thickness was used as the substrate and the polyvinylidene fluoride layer was a copolymer consisting of 95 mol% of vinylidene fluoride and 5 mol% of monochloro-trifluoroethylene. The test specimens were tested for insulating efficiency.

The results of the test were as shown in the table below.

| Insulation material | Polyvinylidene fluoride | | Polyethylene terephthalate | | Polyvinyl chloride | |
|---|---|---|---|---|---|---|
| Time of radiation (min.) | Surface temperature (° C) | Box interior temperature (° C) | Surface temperature (° C) | Box interior temperature (° C) | Surface temperature (° C) | Box interior temperature (° C) |
| 0 | 15.0 | 15.0 | 15.0 | 15.0 | 15.0 | 15.0 |
| 10 | 47.2 | 32.0 | 49.5 | 33.6 | 51.9 | 35.0 |
| 20 | 47.7 | 33.9 | 50.7 | 36.1 | 53.4 | 38.2 |
| 30 | 48.1 | 34.2 | 50.4 | 36.6 | 52.5 | 38.9 |

It is clear from the preceding table that the heat-insulation material of the present invention provides high insulation efficiency even when a metal sheet having high thermal conductivity is used as the substrate, suggesting that the heat-insulation material, when used on a tank and its piping installed outdoors or near a source of heat, will prevent the temperature of their contents from being elevated by the heat from the sun or from another source.

What is claimed is:

1. A heat-insulating laminate comprising a layer of transparent biaxially oriented film of vinylidene fluoride homopolymer or a vinylidene fluoride copolymer which contains at at least 95 mole percent of vinylidene fluoride, an intermediate layer of a metal 0.01 to 0.5 microns in thickness and a substrate layer of plastic, foamed plastic or steel.

2. The heat-insulation material of claim 1, wherein said copolymer comprises vinylidene fluoride and one or more monomers selected from the group consisting of tetrafluoroethylene, hexafluoropropylene, monochloro trifluoroethylene vinyl fluoride, perfluorovinyl alkyl ether, vinyl acetate and ethylene.

3. The heat-insulating laminate of claim 2 wherein said copolymer comprises 95 mole percent of vinylidene fluoride and 5 mole percent of monochlorotrifluorotheylene.

4. The heat-insulation material of claim 1, wherein said metal is copper, silver, gold, magnesium, zinc, cadmium, antimony, aluminum, tin, chromium, nickel, palladium or platinum.

5. The heat-insulation material of claim 1, wherein said plastic is polyvinylchloride, polyethylene, polypropylene, ABS resin, polystyrene, natural rubber, synthetic rubber, polycarbonate, polymethylmethacrylate or polyurethane.

6. The heat-insulation material of claim 1, wherein said substrate layer is a foam selected from the group consisting of foamed polyvinylchloride, polyethylene, polypropylene, ABS resin, polystyrene, natural rubber, synthetic rubber, polycarbonate, polymethylmethacrylate, or polyurethane.

7. The heat-insulation material of claim 1, wherein said transparent film is 2 to 200 microns in thickness.

* * * * *

UNITED STATES PATENT AND TRADEMARK OFFICE

CERTIFICATE OF CORRECTION

PATENT NO. : 4,068,034

DATED : January 10, 1978

INVENTOR(S) : SEGAWA ET AL

It is certified that error appears in the above-identified patent and that said Letters Patent are hereby corrected as shown below:

Column 1, line 48, change "and and" to --and--.

Column 2, line 33, change "of casting" to --or casting--; line 37, after "of" insert --the--; line 64, after "soft" insert --form--; same line, after "foamed" delete "form".

Column 3, line 13, change "biding" to --binding--.

Column 5, line 2, change "increased" to --increases--.

Signed and Sealed this

*Sixth* Day of *June 1978*

[SEAL]

*Attest:*

RUTH C. MASON
*Attesting Officer*

DONALD W. BANNER
*Commissioner of Patents and Trademarks*